(12) United States Patent  
Terada

(10) Patent No.: US 6,324,348 B1  
(45) Date of Patent: Nov. 27, 2001

(54) CAMERA

(75) Inventor: Hiroshi Terada, Mitaka (JP)

(73) Assignee: Olympus Optical Co., Ltd., Tokyo (JP)

( * ) Notice: Subject to any disclaimer, the term of this patent is extended or adjusted under 35 U.S.C. 154(b) by 662 days.

(21) Appl. No.: 09/079,054

(22) Filed: May 14, 1998

Related U.S. Application Data

(63) Continuation of application No. 08/711,820, filed on Sep. 10, 1996, now Pat. No. 5,815,758, which is a continuation of application No. 08/271,342, filed on Jul. 6, 1994, now abandoned.

(30) Foreign Application Priority Data

Jul. 6, 1993 (JP) .................................... 5-167214

(51) Int. Cl.$^7$ ................................................. G03B 17/02
(52) U.S. Cl. ........................................ 396/535; 396/541
(58) Field of Search ............................ 396/535, 540, 396/541, 6

(56) References Cited

U.S. PATENT DOCUMENTS 5,630,176 * 5/1997 Yamashina et al. ..................... 396/6

FOREIGN PATENT DOCUMENTS

2249188 * 4/1992 (GB) ................................... 354/288

* cited by examiner

Primary Examiner—Christopher Mahoney  
(74) Attorney, Agent, or Firm—Kenyon & Kenyon

(57) ABSTRACT

A camera body constructed in such a manner that a front board unit, a shutter unit, and a main body unit are attached to a body plate unit from a rear face of the body plate unit. The body plate unit is a rigid board in a plane substantially perpendicular to an optical axis of a taking lens unit, which taking lens unit is attached to the body plate unit from a front face of the body plate unit.

2 Claims, 11 Drawing Sheets

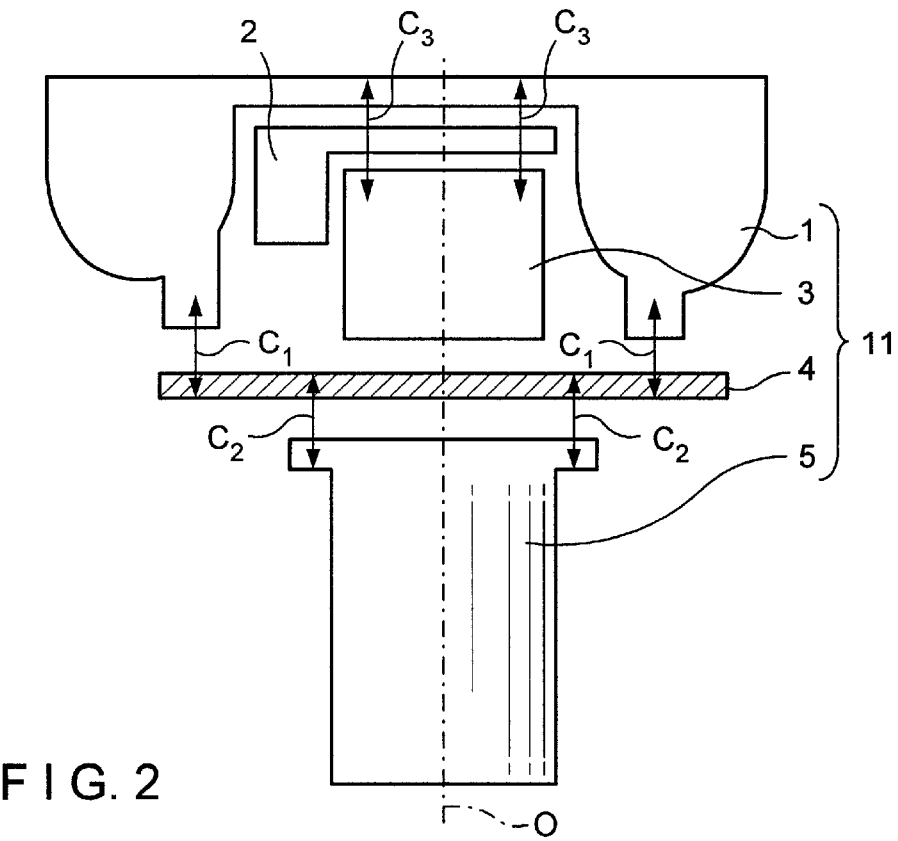
F I G. 2
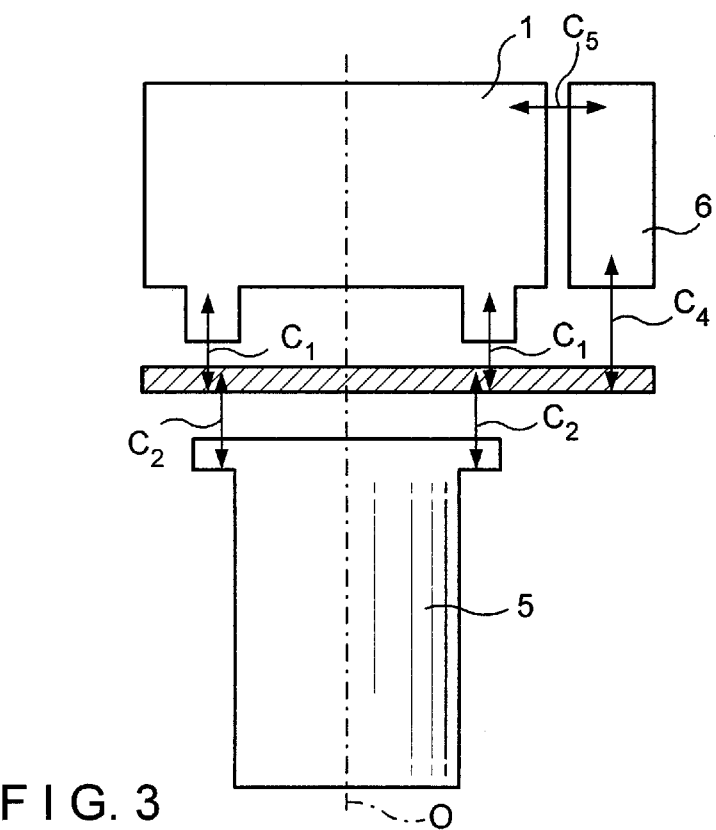
F I G. 3

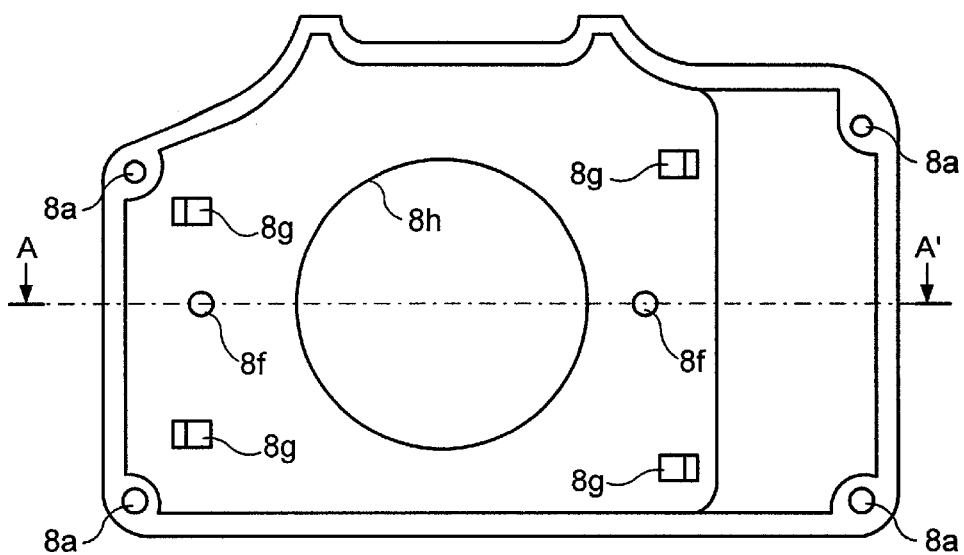
F I G. 8
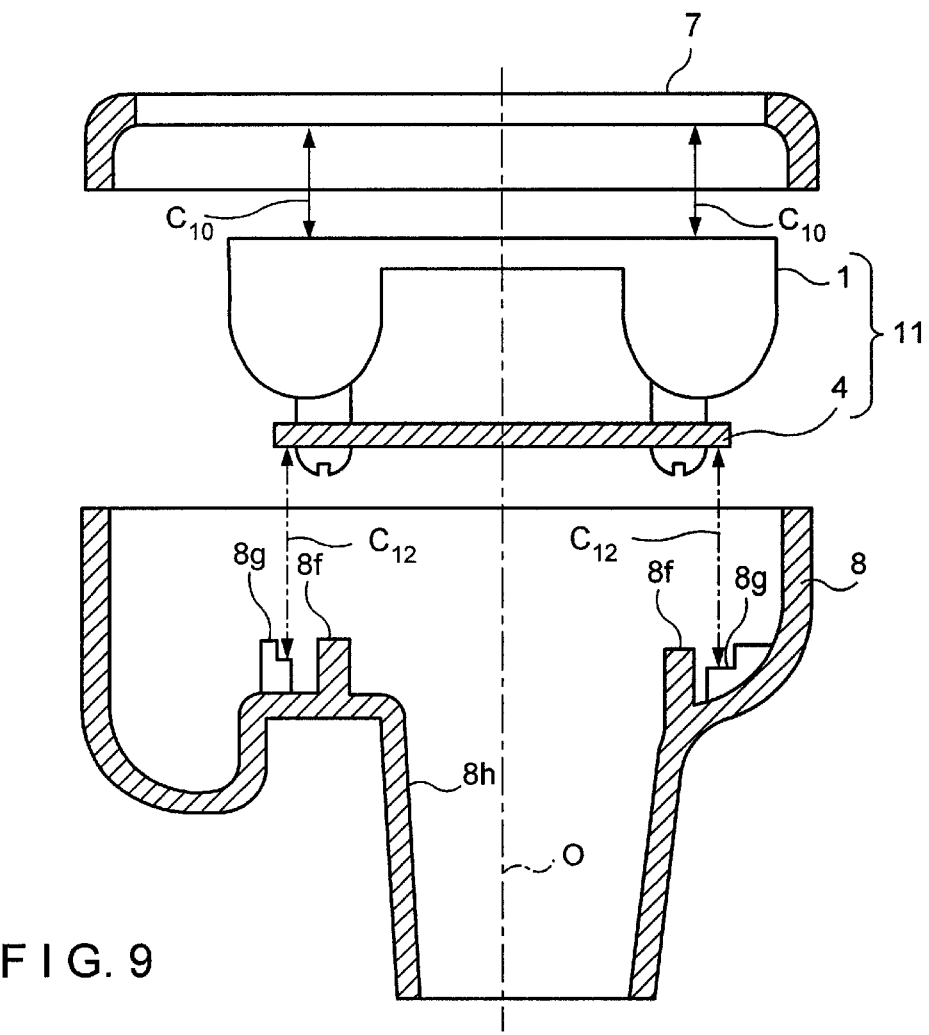
F I G. 9

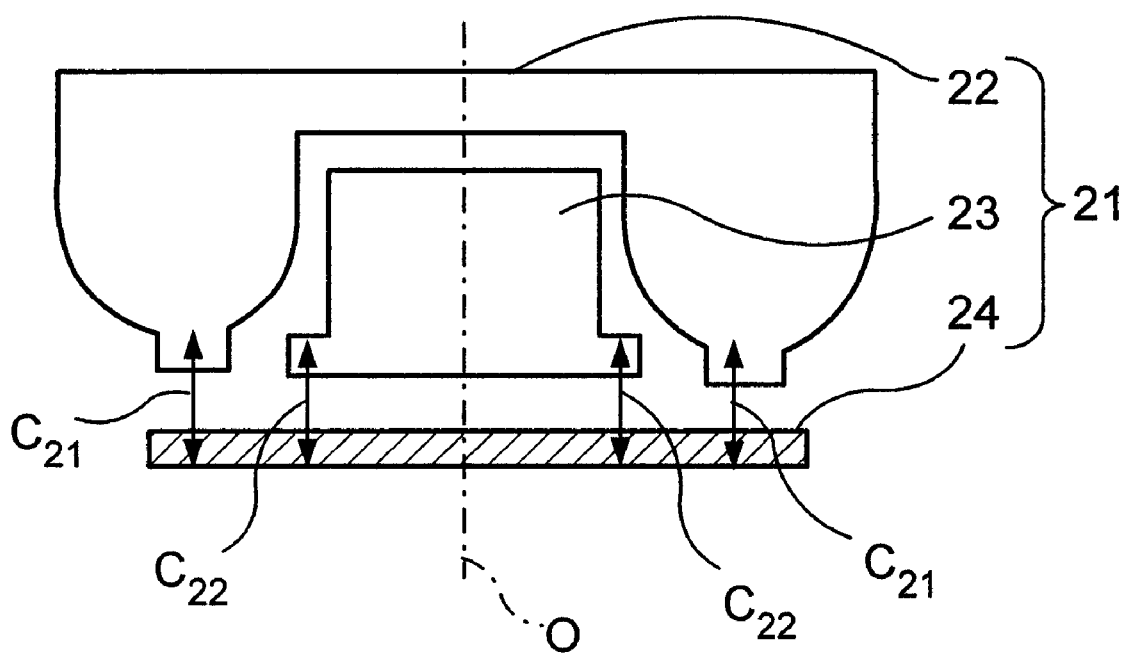
F I G. 10

CAMERA

This application is a continuation of prior application Ser. No. 08/711,820, filed Sep. 10, 1996, now U.S. Pat. No. 5,815,758 which is a continuation of Ser. No. 08/271,342 filed Jul. 6, 1994 (now abandoned).

FIELD OF THE INVENTION

The present invention relates generally to a camera, and in particular to a body structure of a camera.

BACKGROUND OF THE INVENTION

In recent years, cameras which have relatively large zoom ratios have been produced. Because the weight and volume of the lens barrel tends to increase as a function of zoom ratio, the problem arises of providing the body units of such cameras with sufficient internal stiffness. An example of a known approach to this problem is shown in FIG. 11, which shows a conventional type single lens reflex camera with a 5× zoom lens and a camera body structure comprising a stiff front board unit 103 and a lens unit 104 for holding a taking lens. In order to enhance total stiffness of the camera body, the front board unit 103 and the lens unit 104 are attached to a stiff main body unit 101. The front board unit 103 is attached, via a focal plane shutter unit 102, to the main body unit 101 which has a film cartridge chamber 101a. A rear cover unit 105 as an exterior unit is attached to the main body unit from the rear side of the main body unit.

FIG. 12 shows the coupling state of the camera body of FIG. 11. The front board unit 103 and the lens unit 104 are attached to each other with screws at coupling points C31. The main body 101 and the front board unit 103 are attached to each other via the shutter unit 102 with screws at coupling points C32.

FIG. 13 is a perspective view showing the attachment of an exterior unit to the camera body of FIG. 11, which is assembled from the front board unit 103, main body unit 101, etc. A pentagonal prism 110 and an upper cover unit 107 are attached to the front board unit 103 with screws. A cover unit 106, a grip unit 108, and a back cover unit 105 are also attached to the main body unit 101 with screws. Thus, the conventional type camera body shown has a united structure with the front board unit 103, the main body unit 101, and the lens unit 104, thus allowing the attachment of the above-mentioned various exterior units with no reinforcement. A main capacitor 109 for a flash light is held within a grip unit 108.

On the other hand, in the case of a conventional lens shutter type camera with a 3× zoom lens, as shown in FIG. 14, a typical camera body structure includes a main body unit 111 attached to a lens unit 112.

FIG. 15 shows the coupling state of the structure of the camera body of FIG. 14, to which a main body unit 111 and a flange portion of a lens unit 112 are attached to each other with screws at coupling points C41. In this lens shutter type camera, only lens unit 112 consists of a stiff member in order to decrease body weight. In attaching exterior units to the camera body, as shown in FIG. 16, such as a front cover 114 and a rear cover 113, in order to prevent torsionally deforming an exterior unit by screwed engagement, the front cover unit 114 is positionally regulated to the lens unit 112 by fitting the end portion of the lens unit 112 to the opening of the front cover 114. The rear cover 113, as a rear exterior unit, is attached to the main body unit 111 at a thrust portion C42, then the rear cover 113 and the front exterior unit 114 are tightened together with screws at coupling points C43. Thus, the exterior units 113 and 114 are held together with screws which are not directly tightened to the camera body.

In the body structure of the single lens reflex camera, however, both the front board unit 103 and the lens unit 104 are required to have high stiffness, so that the cost of the camera body tends to be high. Furthermore, the volume of the camera becomes greater because the stiff front board unit needs a large setting space. Also, in the body structure of the lens shutter type camera, the lens unit 112 is required to have high stiffness and in order to avoid deformation of the exterior unit by engagement of the screws, the exterior unit cannot be directly tightened with screws to the main body unit 111.

SUMMARY OF THE INVENTION

A first object of the present invention is to solve the above-mentioned drawbacks with known cameras.

A second object of the present invention is to provide a camera which can be made small in size, allows for easy assembly of the exterior unit to the camera body, and can be made at a reasonable cost.

The third object of the present invention is to provide a camera which has sufficient strength while small in size and light-weight.

The camera according to the present invention comprises a rigid board provided on a plane substantially perpendicular to an optical axis, a main body unit attached to the board from one face side, and a lens unit attached to the board from another face side.

As mentioned above, the camera according to the present invention is constructed with the main body unit and the lens unit being attached to the rigid board which is substantially perpendicular to the optical axis, so that the main body unit and the lens unit are not required to have particularly high stiffness. As a result, it is possible to make the camera compact, reasonable in cost, and well-suited for assembly of exterior units to the camera body.

These and other advantages and features of the present invention will become readily apparent to those skilled in the art after reading the following detailed description of the invention and studying the accompanying drawings.

BRIEF DESCRIPTION OF THE DRAWINGS

FIG. 2 is a plan view showing the coupling stats of the camera body of FIG. 1.

FIG. 3 is a side view showing the coupling state of he camera body of FIG. 1.

FIG. 8 is a rear view of a front cover unit of the exterior unit of FIG. 7.

FIG. 9 is a plan view showing the assembly of an exterior unit and the camera body of FIG. 1.

FIG. 10 is a plan view showing the assembly of a camera body according to a second embodiment of the present invention.

DETAILED DESCRIPTION OF THE DRAWINGS

Figure 1:
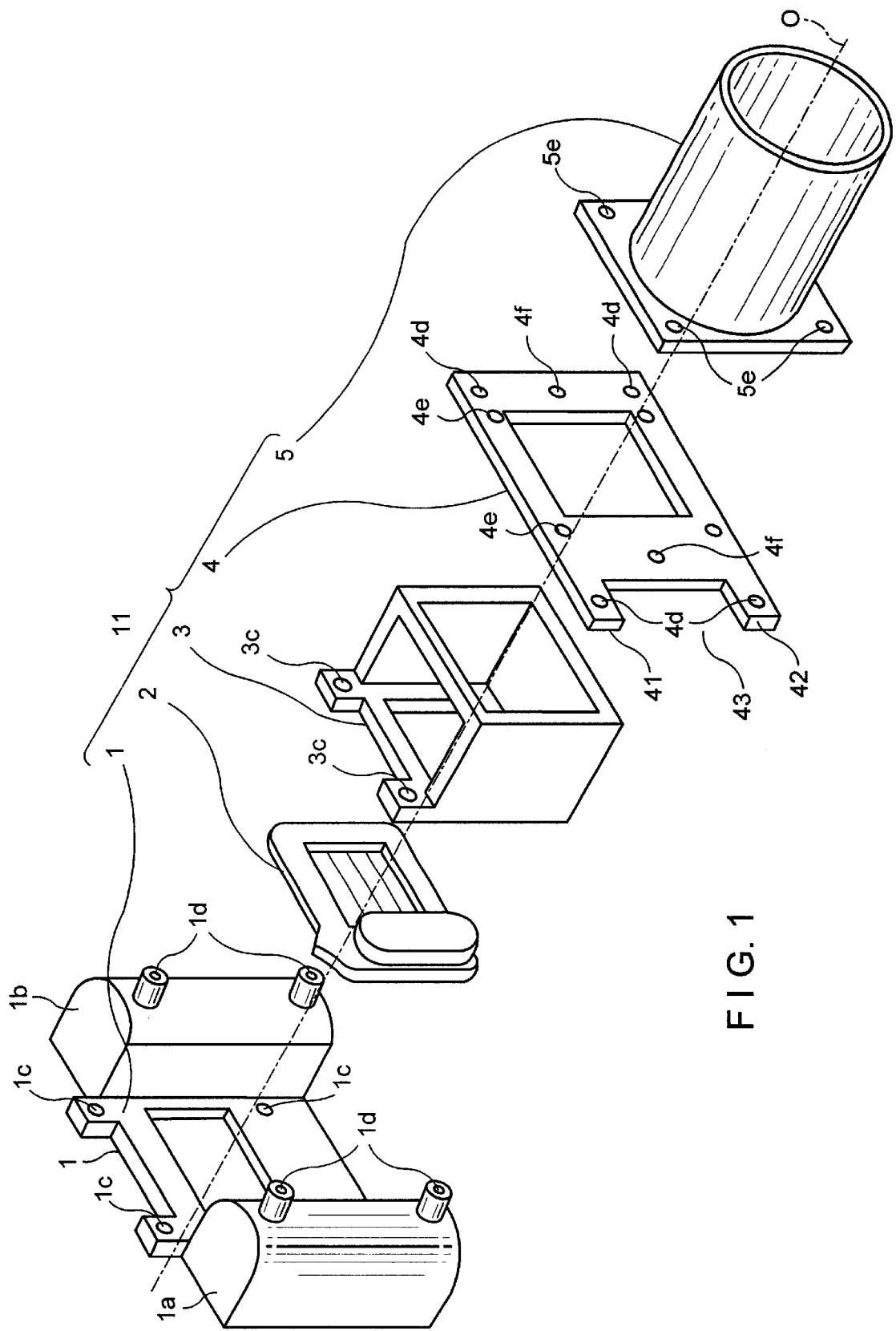
FIG. 1 is an exploded perspective view showing a first embodiment of the present invention.

FIG. 1 is an exploded perspective view showing a camera body according to a first embodiment of the present invention. The symbol 'O' denotes an optical axis of a taking lens shown in the drawings.

The camera of FIG. 1 is a single lens reflex camera. The camera body 11 comprises a main body unit 1, which includes a film cartridge chamber 1a and a film winding spool chamber 1b, a shutter unit 2, which is comprised of a focal plane shutter, a front board unit 3, a body plate unit 4, which is provided in a plane perpendicular to the optical axis O of the taking lens, and a lens unit 5. The main body unit 1, the casing of the shutter unit 2, the front board unit 3, and the frame of the lens unit, except for the body plate unit 4, are comprised of molded plastic. The body plate unit 4 is comprised of a rigid metal planar board made by press processing. In comparison to each unit in the main body unit 1 and the lens unit 5, the body plate unit 4 has greater stiffness against deformation in the direction perpendicular to the optical axis O.

The coupling of the various structural members in the camera body 11 will now be described with reference to FIGS. 1–3. The main body unit 1 and the front board unit 3 are tightened together with screws via bores 1c on the main body unit and bores 3c on the front board unit, as shown in FIG. 1, while capturing therebetween the shutter unit 2 at coupling points C3, as shown in FIG. 2. The lens unit 5 and the front face side of the body plate unit 4 are tightened together with screws, at coupling points C2 shown in FIGS. 2 and 3, via bores 4e on the body plate unit 4 and bores 5e on the lens unit 5, shown in FIG. 1.

As shown in the plan and side views of FIGS. 2 and 3, respectively, the main body unit 1, to which the front board unit 3 has been attached, is tightened with screws, at coupling points C1, to the rear side of the body plate unit 4, to which the lens unit 5 has been attached. The main body unit 1 and the body plate unit 4 are coupled via bores 4d in the body plate unit 4 and bores 1d on the main body unit 1. A pair of protruding arms, each with a bore 4d, are provided on one edge of the body plate unit 4. A space between the protruding arms is designated as space 43. A main capacitor for a flash light (not shown) will be located within the space 43.

The camera body 11, with sufficient stiffness, is obtained by assembling each unit 1, 2, 3, and 5, via the body plate unit 4 as a reinforcement member. The units 1, 2, 3, and 5 have a minimum required stiffness, so that they can be made of molded plastic, and can be made thinner. Furthermore, the camera body 11 is well-adapted for assembly of the exterior units, as will be described below.

A power unit 6 embedded driving system is assembled in the camera body via the main body unit 1 and the body plate unit 4. As shown in the side view of FIG. 3, the power unit 6 is tightened with screws to the bottom of the main body unit 1 at a coupling point C5. The power unit 6 is also tightened with screws to the body plate unit 4 at a coupling point C4.

Figure 4:
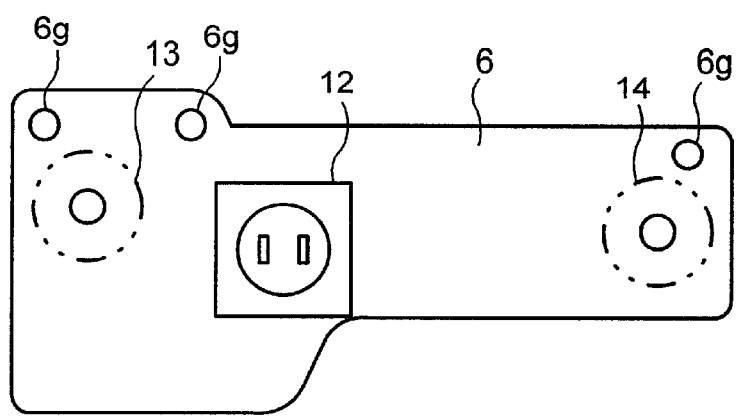
FIG. 4 is a plan view showing a power unit for the camera of FIG. 1.
Figure 5:
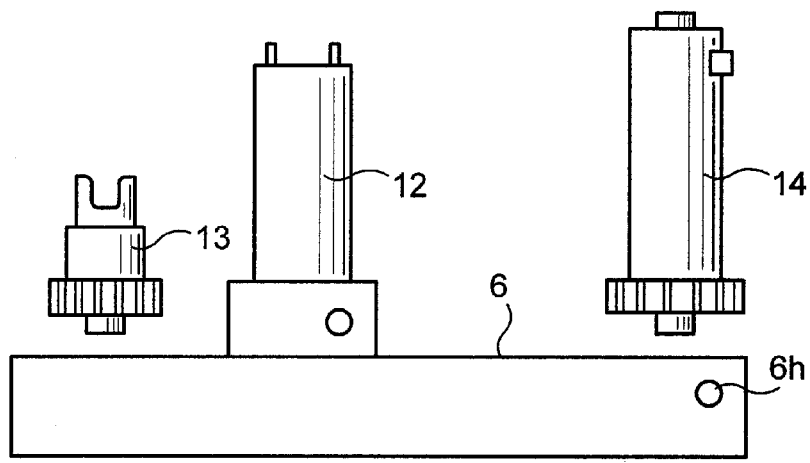
FIG. 5 is a front view showing a power unit for the camera of FIG. 1.
Figure 6:
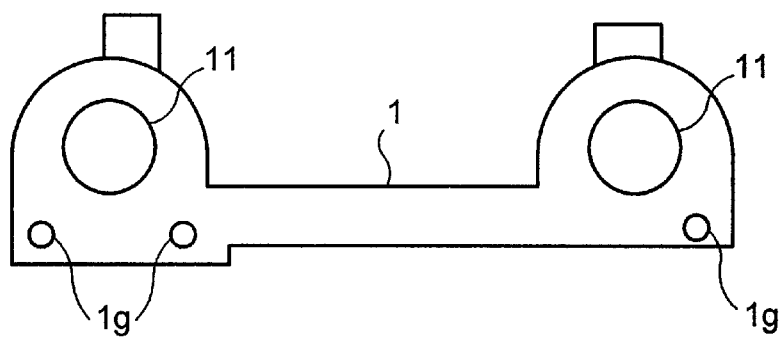
FIG. 6 is a rear view showing a main body unit of the camera of FIG. 1.

FIGS. 4 and 5 are the plan view and the front view, respectively, of the power unit 6. A driving motor 12, a film rewinding fork gear 13, and a film winding spool gear 14 are provided on the power unit 6. Bores 6g and 6h are provided on the power unit 6 for coupling the power unit to the main body unit 1 and the body plate unit 4. As shown in FIG. 6, screw bores 1g corresponding to the screw bores 6g are provided on the bottom portion of the main body unit 1. A rewinding fork insert hole 1i and a spool gear insert hole 1j are also provided on the bottom portion of the main body unit 1.

Figure 7:
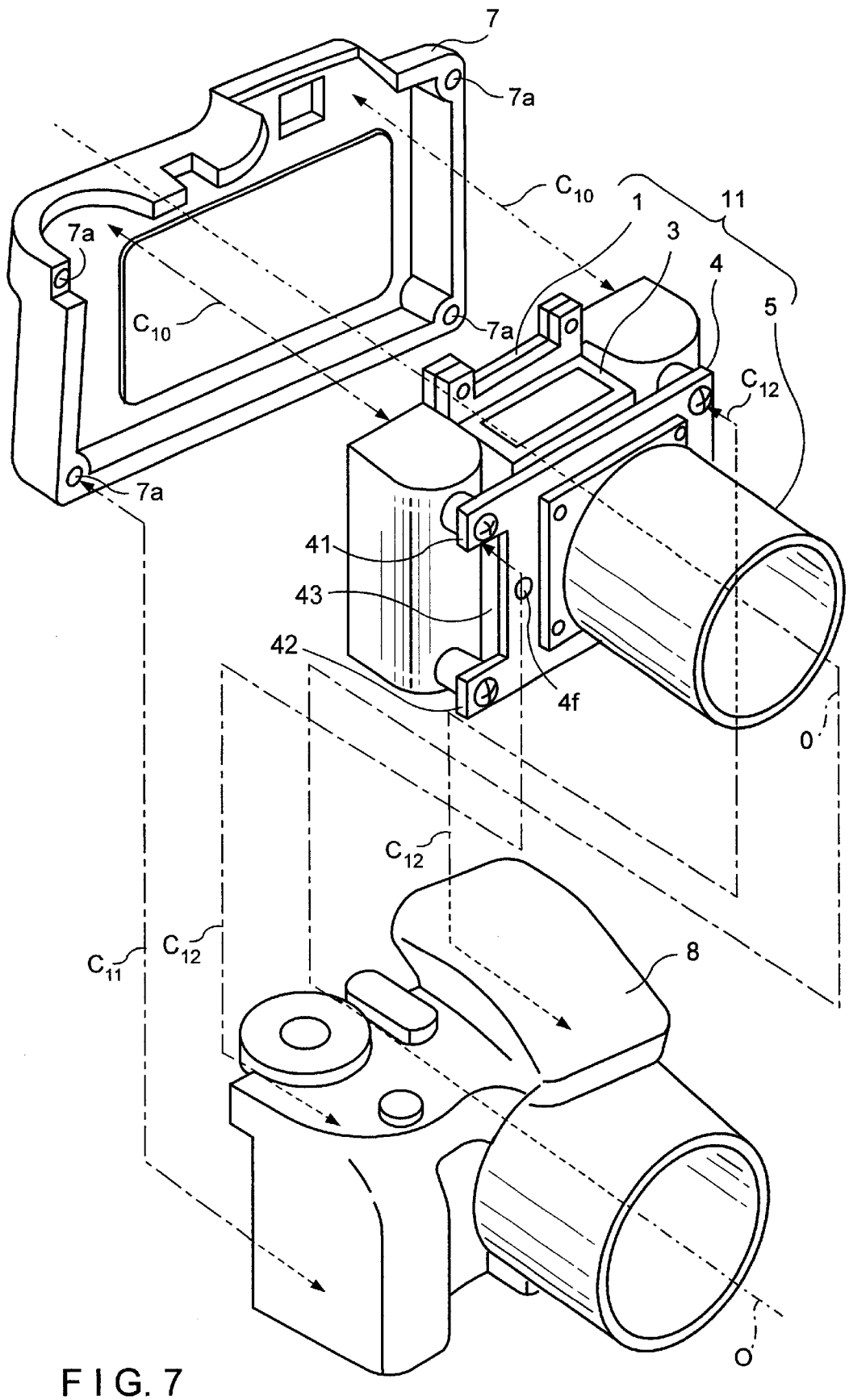
FIG. 7 is an exploded perspective view showing the assembly of an exterior unit and the camera body of FIG. 1.
Figure 11:
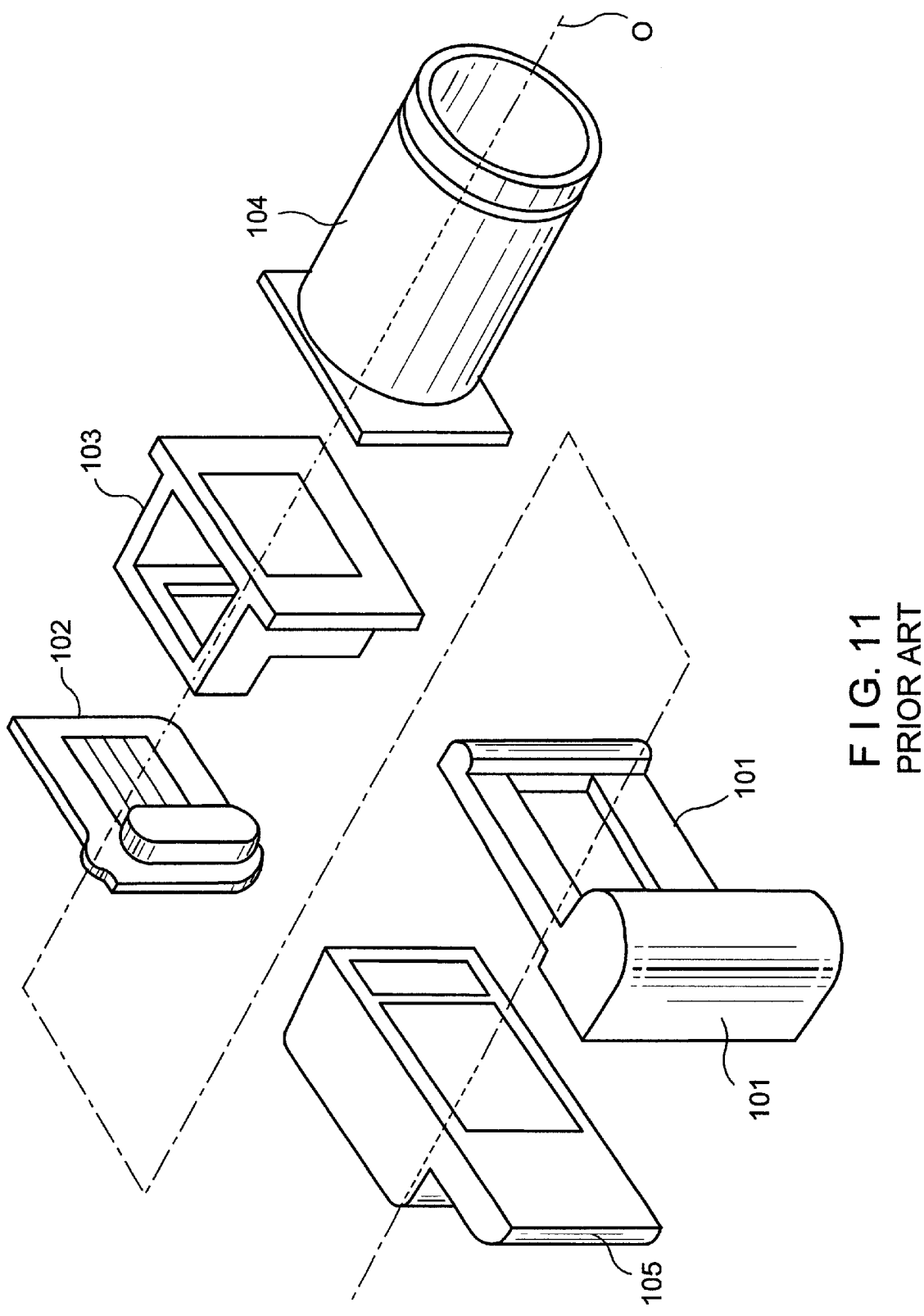
FIG. 11 is an exploded perspective view showing a prior art single lens reflex camera.
Figure 12:
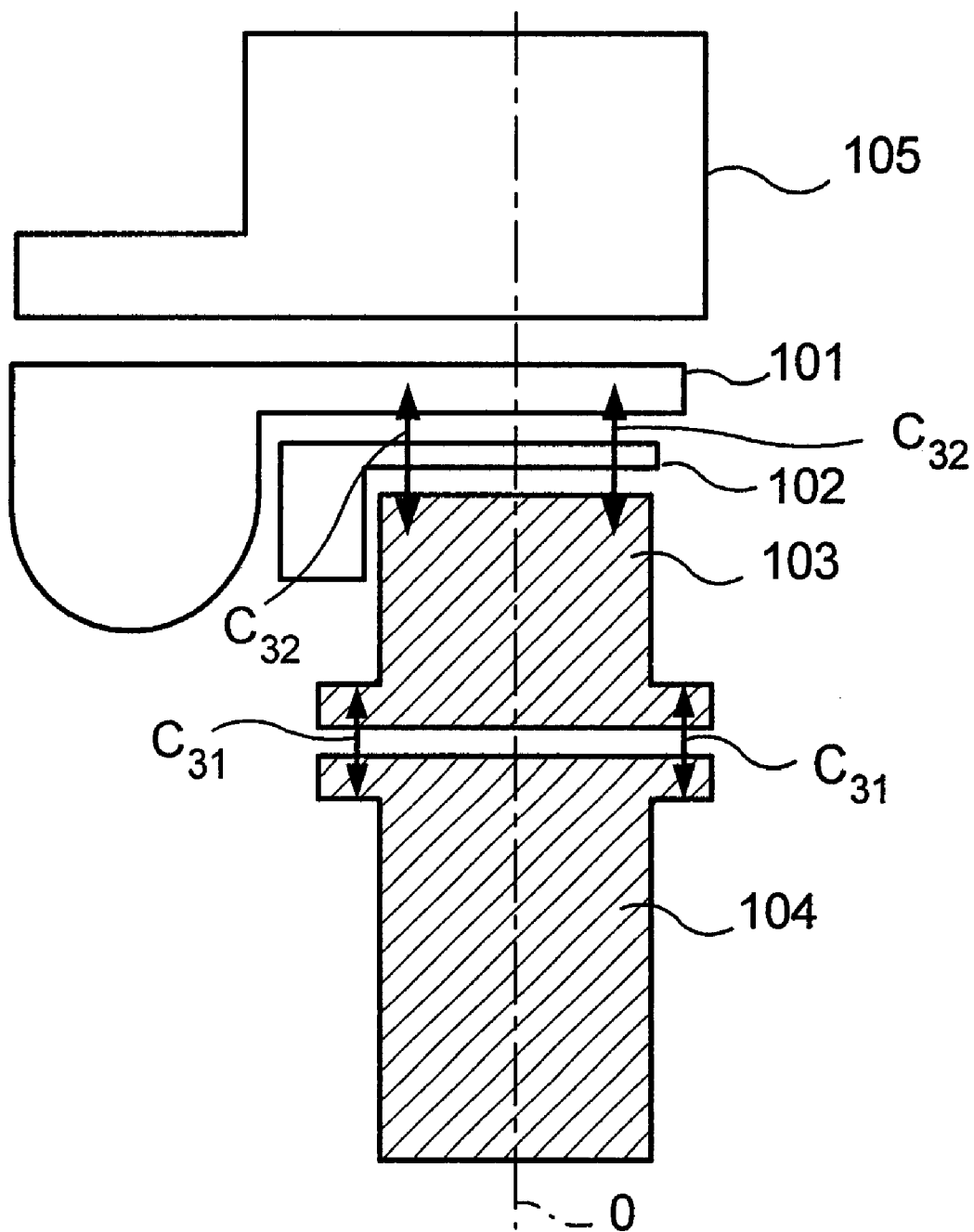
FIG. 12 is a plan view showing the coupling state of the camera of FIG. 11.
Figure 13:
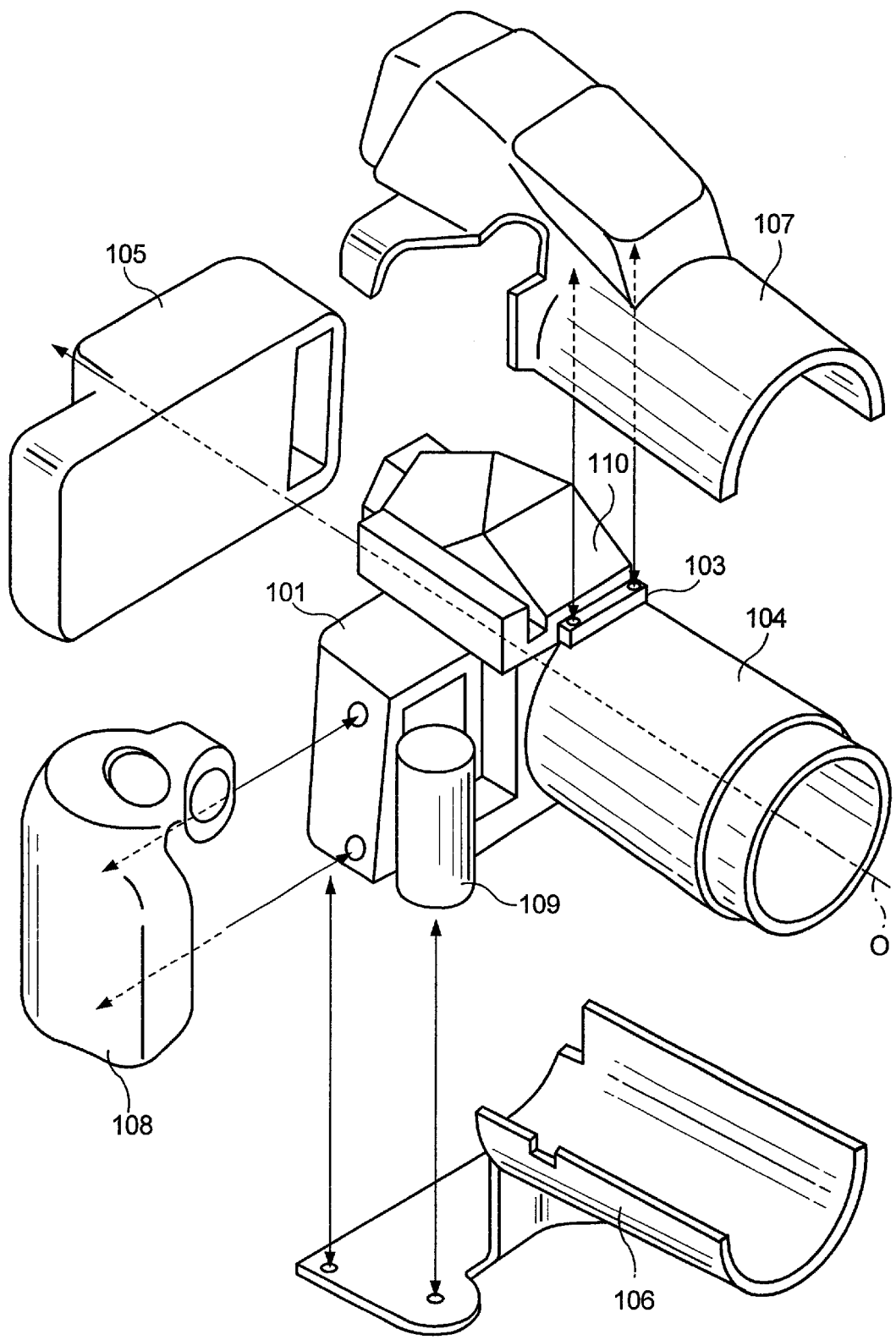
FIG. 13 is an exploded view showing the assembly of an exterior unit and the camera body of FIG. 11.
Figure 14:
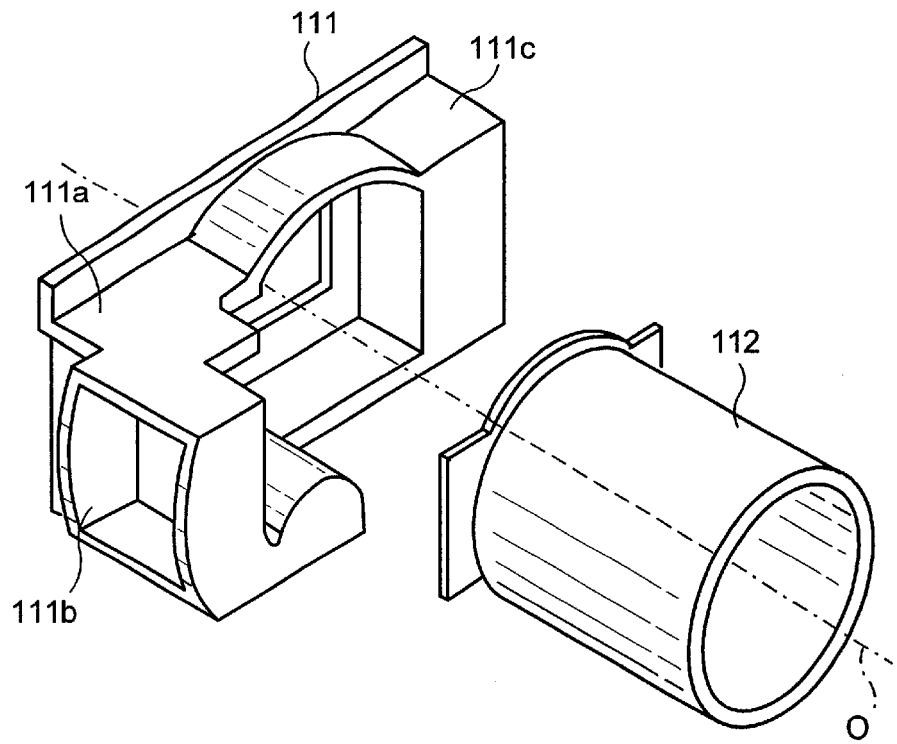
FIG. 14 is an exploded view showing a camera body of a prior art lens shutter camera.
Figure 15:
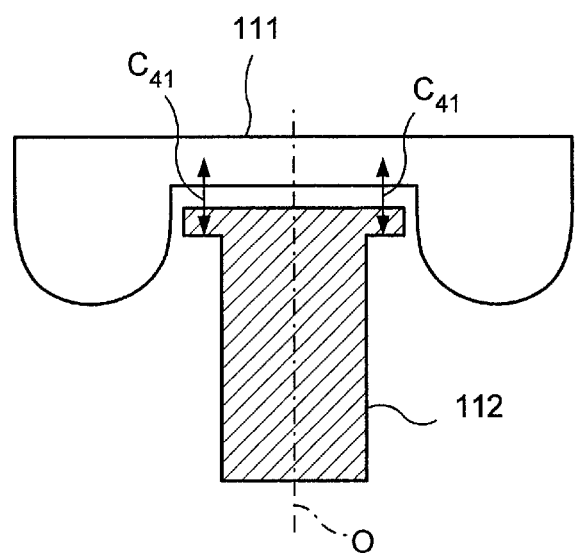
FIG. 15 is a plan view showing the coupling state of the camera of FIG. 14.
Figure 16:
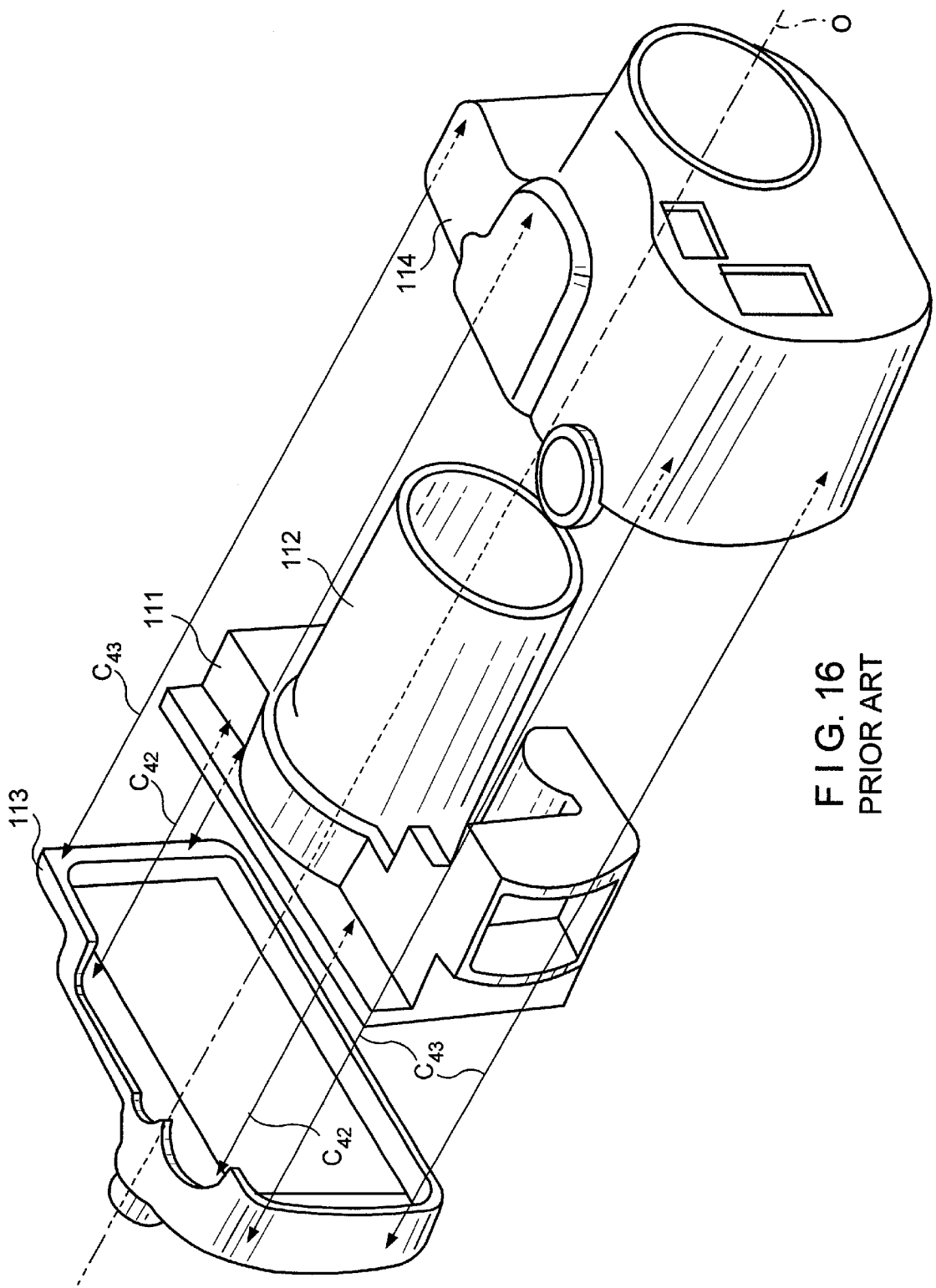
FIG. 16 is an exploded view showing the assembly of an exterior unit and the camera body of FIG. 14.

FIG. 7 is an exploded perspective view showing the assembly of each exterior unit to the camera body 11, comprised of the main body unit 1, the front board unit 3, the body plate unit 4, and the lens unit 5.

A pressing portion of a rear cover 7, as a first exterior unit, presses the main body unit 1 upon coupling the rear cover 7 to a front cover unit 8. The front cover unit 8, as a second exterior unit, is mated to the main body unit 1 at fitting points C12 near the coupling points of the body plate unit 4 and the main body unit 1. The front cover 8 is attached to the rear cover 7 with screws via bores 8a and 7a. The main body unit 1 is thus caught by the body plate unit 4 and the rear cover 7.

FIG. 8 is a rear view showing the back face of the front cover 8. Two positioning bosses 8f and four fitting projections 8g are provided as positional limiters of the body plate unit at both sides of the central opening 8h for the central lens unit.

FIG. 9 is an exploded plan view showing the coupling state of the front cover 8, the rear cover 7, and the camera body 11. The front cover 8 and the rear cover 7 are shown at the cross section A–A' (FIG. 8). The front cover 8 is positionally limited by fitting the positioning bosses 8f into bores 4f in the body plate unit 4 (see FIG. 1). Additionally, projections 8g in the front cover 8, which are formed with side edge portions, provide fitting points C12 for retaining the body plate unit 4 upon assembly. When the front cover 8 and the rear cover 7 are tightened with screws, the camera body 11 is secured therebetween.

As mentioned above, when assembling each exterior unit, such as the rear cover 7, the front cover 8, etc., the exterior units should be tightened with the main body unit 1 and the body plate 4 intervening between the exterior units, so that the exterior units catch the body plate unit 4. Thus, deformation due to screw engagement will not occur and a small size and low cost camera is realized.

FIG. 10 shows the coupling state of a camera body according to a second embodiment of the present invention. This embodiment shows the present invention applied to a lens shutter type camera. In a camera body 21 according to this embodiment, a main body unit 22 and a lens unit 23 are tightened with screws to the same side of a body plate unit 24, at coupling points C21 and C22. The body plate unit 24 is a rigid plate, such as a metal planar plate made by a press process, in a plane perpendicular to an optical axis O of a taking lens.

Upon assembly, the main body unit 22 and the lens unit 23 are attached to the stiff body plate unit 24, so that even if the units 22 and 23 lack substantial strength, high stiffness can nonetheless be imparted to the camera body 21. Thus, as with the first embodiment, the main body unit and the lens unit of the second embodiment are not required to have especially high stiffness, thus enabling to make the camera compact, manufacturable at a reasonable cost, and well-adapted for easy attachment of exterior units to the camera body.

It is understood that changes may be made in the particular embodiments of the present invention described, which are within the full intended scope of the invention as defined by the appended claims.

What is claimed is:

1. A camera comprising:

a rigid board;

a main body unit formed of a molded plastic material, the main body unit being mounted on one side of the rigid board;

a taking lens unit mounted on another side of the rigid board, wherein an optical axis of the taking lens unit is substantially perpendicular to the rigid board;

a first casing unit for covering the main body unit, the first casing unit abutting the main body unit; and a second casing unit for covering the taking lens unit, the second casing unit being fastened to the first casing unit by screws and abutting the rigid board to prevent the rigid board from moving along an axis perpendicular to the optical axis of the photo-taking lens unit, wherein:

a block including the rigid board, the main body unit and the taking lens unit is caught between the first and second casing units, the second casing unit includes a plurality of protrusions for engagement with the rigid board, the rigid board includes a plurality of bores, and the plurality of protrusions include:

a plurality of bosses, each boss being received by a corresponding one of the plurality of bores, and a plurality of fitting projections for abutment against an opposing surface of the rigid board.

2. The camera according to claim 1, wherein each one of the plurality of fitting projections includes a side edge portion providing a corresponding fitting point for retaining the rigid board.

* * * * *